United States Patent [19]

Mizuta

[11] Patent Number: 5,231,497
[45] Date of Patent: Jul. 27, 1993

[54] METHOD OF INTERPOLATING ONE VIDEO IMAGE FIELD TO CREATE AN INTERLACED IMAGE FIELD

[75] Inventor: Masashi Mizuta, Kanagawa, Japan

[73] Assignee: Sony Corporation, Tokyo, Japan

[21] Appl. No.: 805,615

[22] Filed: Dec. 12, 1991

[30] Foreign Application Priority Data

Dec. 26, 1990 [JP] Japan .................. 2-414489

[51] Int. Cl.⁵ .............................................. H04N 5/21
[52] U.S. Cl. .................................... 358/166; 358/167
[58] Field of Search ............. 358/105, 140, 160, 138, 358/167, 31, 166, 36, 37

[56] References Cited

U.S. PATENT DOCUMENTS

| 4,524,382 | 6/1985 | Tanaka et al. | 358/31 |
| 4,661,842 | 4/1987 | Ishige et al. | 358/31 X |
| 5,001,563 | 3/1991 | Doyle et al. | 358/140 |
| 5,019,903 | 5/1991 | Dougall et al. | 358/140 |
| 5,032,899 | 7/1991 | Sato | 358/140 X |

Primary Examiner—Victor R. Kostak
Attorney, Agent, or Firm—Jay H. Maioli; Lewis H. Eslinger

[57] ABSTRACT

A method of image data interpolation for obtaining an interlaced image signal by utilizing an image signal of only one field. The method includes the steps of obtaining another field signal by directly utilizing a given field signal or by employing a mean value interpolation processing at a portion of an image where a luminance of the image does not change in the vertical direction, obtaining another field signal by employing the mean value interpolation processing at a portion where a luminance of an image changes singularly to the vertical directions, and obtaining another field signal by directly utilizing a given field signal at some point of a portion where a luminance of an image changes a number of times in the vertical direction.

1 Claim, 9 Drawing Sheets

METHOD OF INTERPOLATING ONE VIDEO IMAGE FIELD TO CREATE AN INTERLACED IMAGE FIELD

BACKGROUND OF THE INVENTION

1. Field of the Invention

The present invention generally relates to a method of image data interpolation and, more particularly, is directed to a method of image data interpolation used for converting a field signal into an interlaced signal in an image signal processing apparatus.

2. Description of the Prior Art

In a video tape recorder (VTR), a video disk apparatus or an image signal processing apparatus using a frame memory, an interlaced signal is generally obtained by using an image signal of only one field. As a first example of this method of obtaining an interlaced signal, there has been proposed a method of obtaining an interlaced signal of two fields by using the same field signal. In this example, when an odd field signal shown in FIG. 1A, for example, is supplied, the same signal as the odd field signal is outputted as an even field signal as shown in FIG. 1B. FIG. 1C shows a diagram illustrating lines of FIG. 1B seen from the lateral direction.

As a second example of the above-described method, there has been proposed a method of interpolating data by using a mean value of a given field signal (hereinafter referred to as mean value interpolation method). FIG. 2 shows a block diagram of a mean value interpolation circuit for realizing the mean value interpolation method. Referring to FIG. 2, an odd field signal is applied to a one-horizontal line delay circuit 2 and also to a divider circuit 4 for dividing an input signal by a factor of two, then the output signal of the delay circuit 2 is applied to another divider circuit 6 for dividing by a factor of two. The output signals of the divider circuits 4 and 6 are added by an adder 8, and then the input odd field signal and the output of the adder 8 are alternately outputted as an output signal X in response to an even or odd signal, respectively. Thus, another field signal is obtained as shown in FIG. 3B by obtaining a mean value of two data of contiguous two odd field signals shown in FIG. 3A. FIG. 3C is a diagram illustrating lines of FIG. 3A seen from the lateral direction. Accordingly, an interlaced signal is obtained by using the image signal of only one field.

However, the above-described first example of the conventional interpolation method has the disadvantage such that a line flicker is generated between an even line a and an odd line b shown in FIG. 1B, so that a slant line appears to be broken and V-jitter configuration. That is, a portion having a high-frequency component where the luminance or level of an image changes abruptly in the vertical direction is returned by an interlaced carrier to cause a flicker of 30 Hz. This means that a center of a point where the level of an image changes in the vertical direction fluctuates depending on the field numbers.

Also, in the second example of the conventional interpolation method, a slant line appears to be smooth and the generation of the line flicker is less when compared with the first example. However, the image signal thus obtained through the mean value interpolation processing is that filtered by a vertical low-pass filter (LPF) having a dip point at a 525/2 line, so that apparent sharpness is degraded. Further, at a portion where the luminance of an image changes finely in the vertical direction such as a fine stripe extending to the horizontal directions, a flicker will appear at a large area. As a typical example, when the mean value interpolation processing is performed as to an image signal whose image of an odd field changes at every line as shown in FIG. 4A, a field signal generated by the processing will have a large DC component as shown in FIG. 4B and will be quite different from the image of the given field as shown in FIG. 5. FIG. 4C is a diagram illustrating the lines of FIG. 4B seen from the lateral direction wherein data of an image of an even field is equalized in level by the adjacent data of an odd field.

OBJECTS AND SUMMARY OF THE INVENTION

It is an object of the present invention to provide an improved method of image data interpolation in which the aforementioned shortcomings and disadvantages encountered with the prior art can be eliminated.

More specifically, it is an object of the present invention to provide a method for image data interpolation which can not only decrease the changes of a slant line and the line flicker of V-jitter configuration without degrading the apparent sharpness but also prevent the generation of the flicker at a portion where the level of an image changes finely in the vertical direction.

As an aspect of the present invention, a method of image data interpolation for obtaining an interlaced image signal by utilizing an image signal of only one field comprises the steps of obtaining another field signal by directly utilizing a given field signal or by employing a mean value interpolation processing at a portion of an image where a luminance of the image does not change in a vertical direction, obtaining another field signal by employing the mean value interpolation processing at a portion where a luminance of an image changes in the vertical direction, and obtaining another field signal by directly utilizing a given field signal at some point of a portion where a luminance of an image changes and a number of times in the vertical direction.

According to the interpolation method of the present invention, the broken changes of a slant line and the line flicker of V-jitter configuration can be decreased without degrading apparent sharpness, and further flickers are prevented from being generated at a portion where the luminance of an image changes finely to the vertical directions.

The preceding and other objects, features, and advantages of the present invention will become apparent from the following detailed description of illustrative embodiment thereof when read in conjunction with the accompanying drawings, in which like reference numerals are used to identify the same or similar parts in the several views.

DESCRIPTION OF THE PREFERRED EMBODIMENT

An image data interpolation method according to a preferred embodiment of the present invention will now be described with reference to FIGS. 6 to 12.

According to the embodiment of the present invention, the interpolation is performed in a manner that, (1) at a portion of an image where there is no change in the vertical direction, the interpolation processing is performed by directly utilizing a given field signal as another field signal or by employing the mean value interpolation processing; (2) at a portion where there is a change in the vertical direction, the mean value interpolation processing is employed; and succeedingly (3) at some point of a portion where there is a change a number of times in the vertical direction, another field signal is generated by directly employing a given field signal. These interpolation processings (1) to (3) can be performed by utilizing a well-known logical filter.

Figures 1A, 1B, 1C:
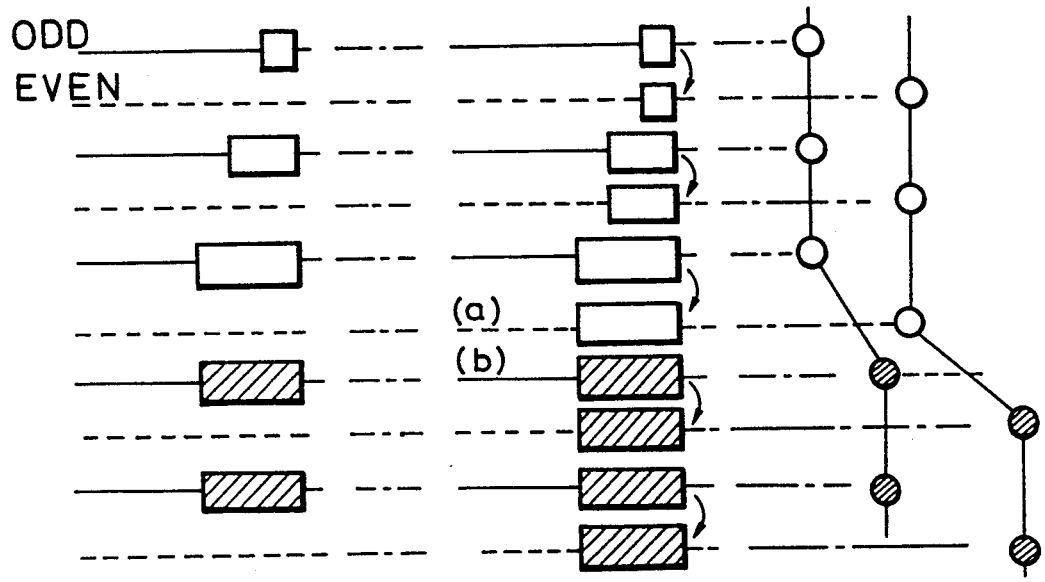
FIGS. 1A to 1C show schematic diagrams used to explain a conventional interpolation processing for obtaining another field signal by directly using a given field signal.
Figure 2:
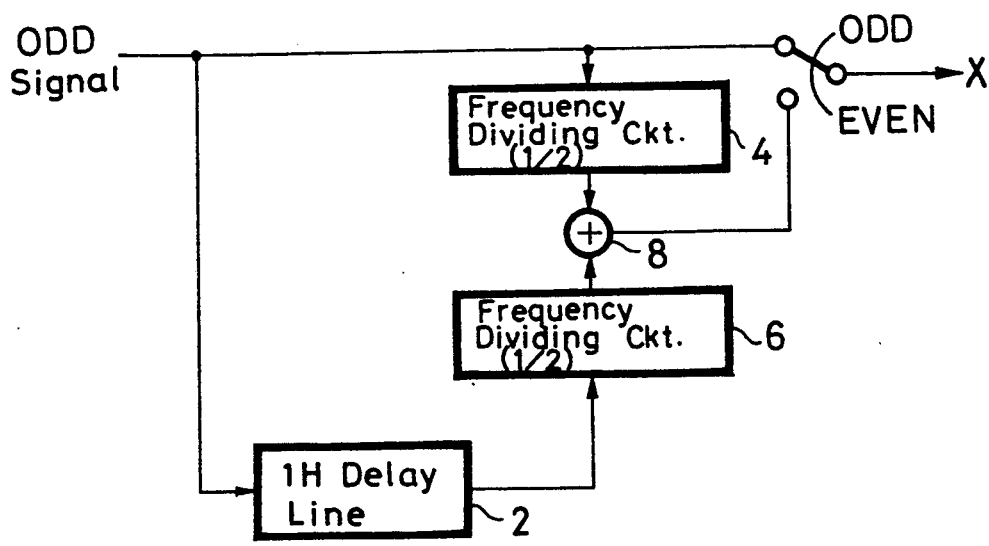
FIG. 2 shows in block form an arrangement of a mean value interpolation circuit to which the conventional mean value interpolation method is applied.
Figures 3A, 3B, 3C:
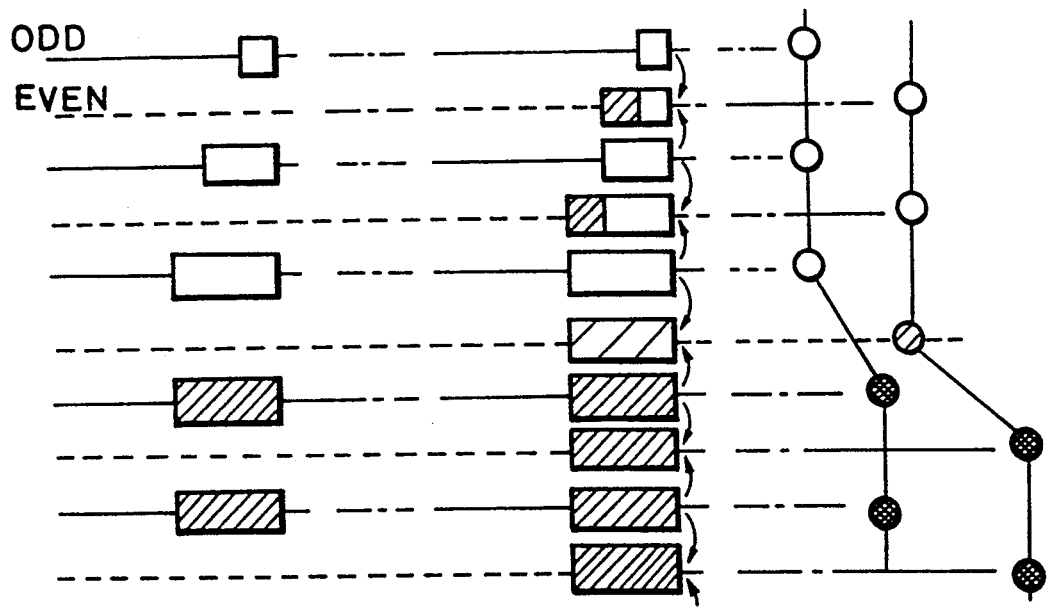
FIGS. 3A to 3C show schematic diagrams used to explain the mean value interpolation processing performed by the mean value interpolation circuit of FIG. 2.
Figures 4A, 4B, 4C:
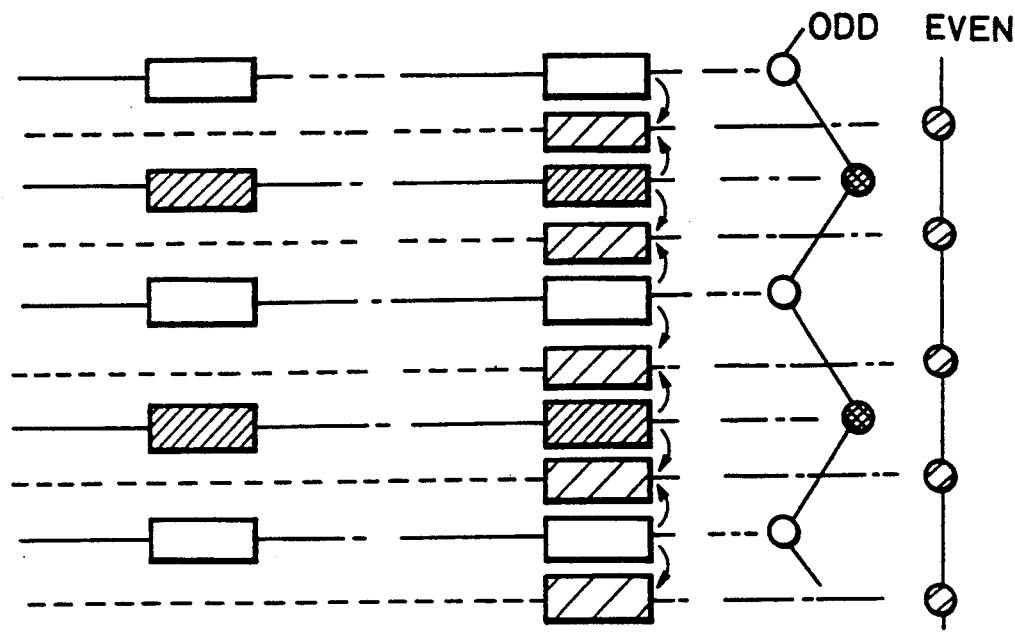
FIGS. 4A to 4C show schematic diagrams used to explain the mean value interpolation processing shown in FIGS. 3A to 3C.
Figure 5:
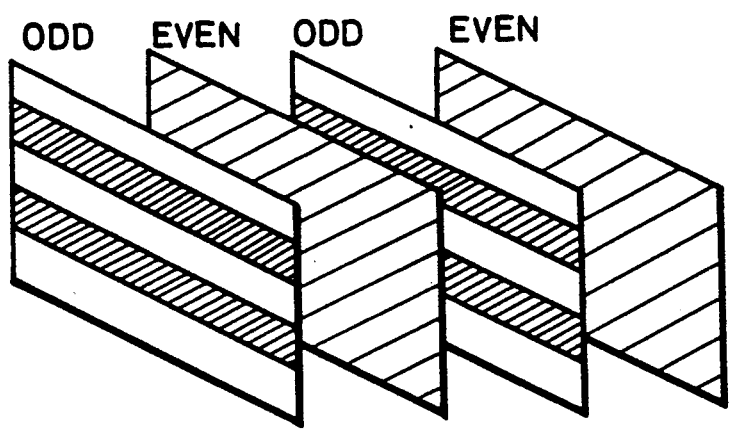
FIG. 5 shows a perspective view of images of a plurality of fields used to explain that an image obtained by the mean value interpolation processing of FIGS. 3A to 3C differs from that of a given field.
Figure 6:
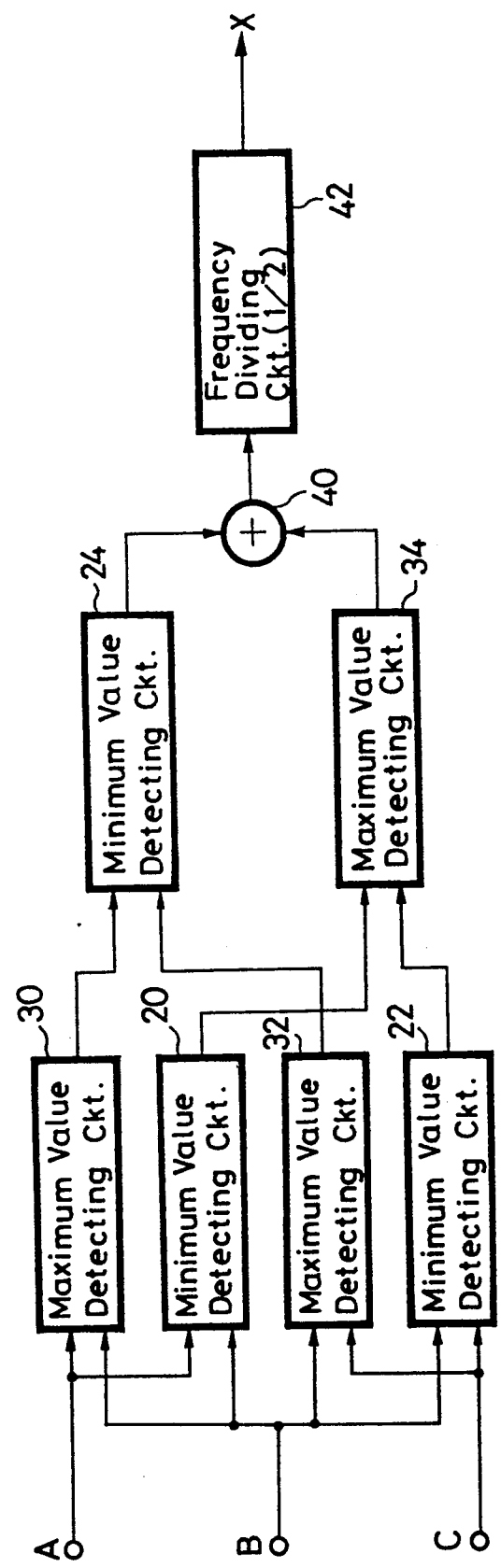
FIG. 6 shows in block form a basic arrangement of a logical filter for realizing the image data interpolation method according to the present invention.

FIG. 6 is a block diagram illustrating the basic configuration of the known logical filter. Referring to FIG. 6, each of minimum value detection circuits (hereinafter referred to as MIN) 20, 22, 24 outputs a signal having a smaller value between two input signals to be compared, and each of maximum value detection circuits (hereinafter referred to as MAX) 30, 32, 34 outputs a signal having a larger value between two input signals to be compared. The output signals of the MIN 24 and MAX 34 are added by an adder 40, and then divided by a factor 2 by a divider 42 to thereby be delivered as an output signal X of the logical filter, which is given by $$X = \frac{1}{2}[MIN\{MAX(A,B), MAX(B,C)\} + MAX\{MIN(A,B), MIN(B,C)\}]$$

Figure 7:
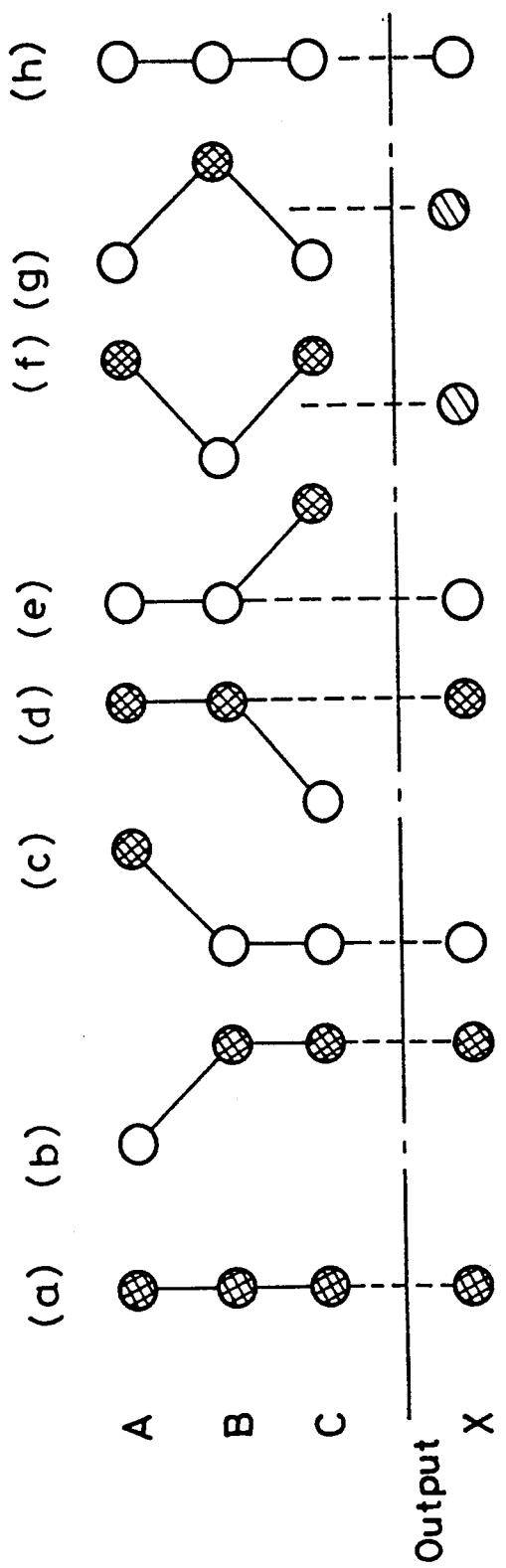
FIG. 7 shows a schematic diagram used to explain the operation of the logical filter of FIG. 6.

FIG. 7 is a diagram illustrating relations among three input signals of three horizontal scanning lines A, B and C applied to three input terminals of the filter of FIG. 6 and an output signal X thereof.

Referring to FIG. 7, (a) to (h) illustrate eight output levels respectively in association with eight sets of patterns of the levels of the three input lines. Each of (f) and (g) of FIG. 7 differs from other patterns in a point that a mean value among maximum and minimum values of the three lines A, B and C is outputted.

Figure 8:
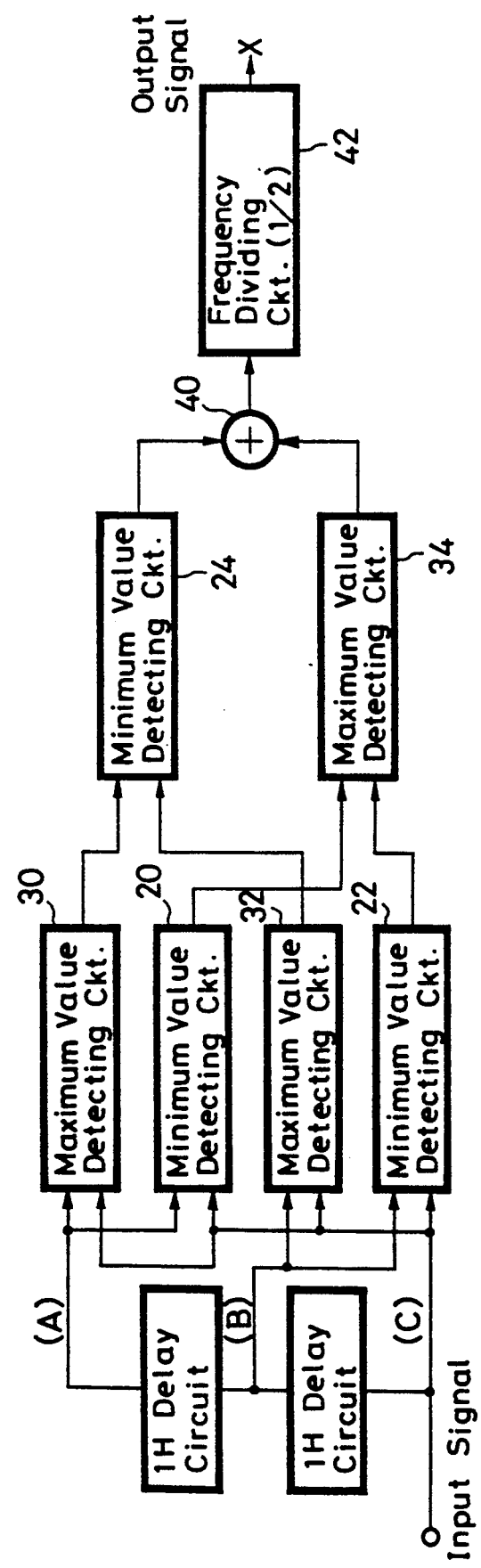
FIG. 8 shows in block form an arrangement of an interpolation circuit in which the logical filter of FIG. 6 is applied to the interpolation method of the present invention.

FIG. 8 is a block diagram illustrating an interpolation circuit in which the logical filter of FIG. 6 is applied to the interpolation method of the present invention. The interpolation circuit is constituted in a manner as described above that, (1) at a portion of an image where the luminance of the image does not change in the vertical direction, the interpolation processing is performed by directly utilizing a given field signal as another field signal or by employing the mean value interpolation processing; (2) at a portion where the luminance of an image changes stepwise in the vertical direction, the mean value interpolation processing is employed; and succeedingly (3) at some point of a portion where the luminance of an image changes repetitively and finely in the vertical direction, another field signal is generated by directly employing a given field signal. By this interpolation circuit, a signal subjected to the interpolation processing can be obtained from an image signal pattern of three lines contiguous in the vertical direction. Namely, when three lines A, B and C of an odd field are applied to the interpolation circuit, for example, there is obtained a line of an even field positioned between the lines B and C. Thus, the output signal X of the interpolation circuit of FIG. 8 is given by $$X = \frac{1}{2}[MIN\{MAX(A,C), MAX(B,C)\} + MAX\{MIN(A,C), MIN(B,C)\}]$$

Figure 9:
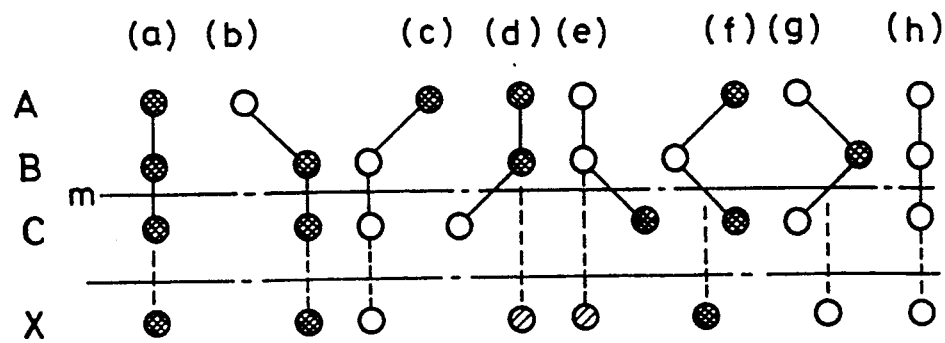
FIG. 9 is a schematic diagram illustrating a relation between input signal patterns and output signals obtained by the interpolation processing in the circuit of FIG. 8.

FIG. 9 shows a relation among input patterns applied to the interpolation circuit of FIG. 8 and outputs X representing the results of the interpolation processing. Referring to FIG. 9, the explanation will be made in the case that the interpolation processing is performed in order to obtain a signal at a point m between the lines B and C. In each of (a) and (h), since the luminance of an image does not change in the vertical direction, a given field signal is directly outputted as an output signal X representing another field signal. In each of (d) and (e) where the luminance of an image changes singularly, the mean value interpolation processing is employed. In each of (b) and (c) where the luminance of an image is constant or flat after the singularly change, a given field signal is directly used as another field signal. Further, in each of (f) and (g), where the luminance of an image changes a number of times in the vertical direction, another field signal is generated by directly utilizing a given field signal.

Figure 10:
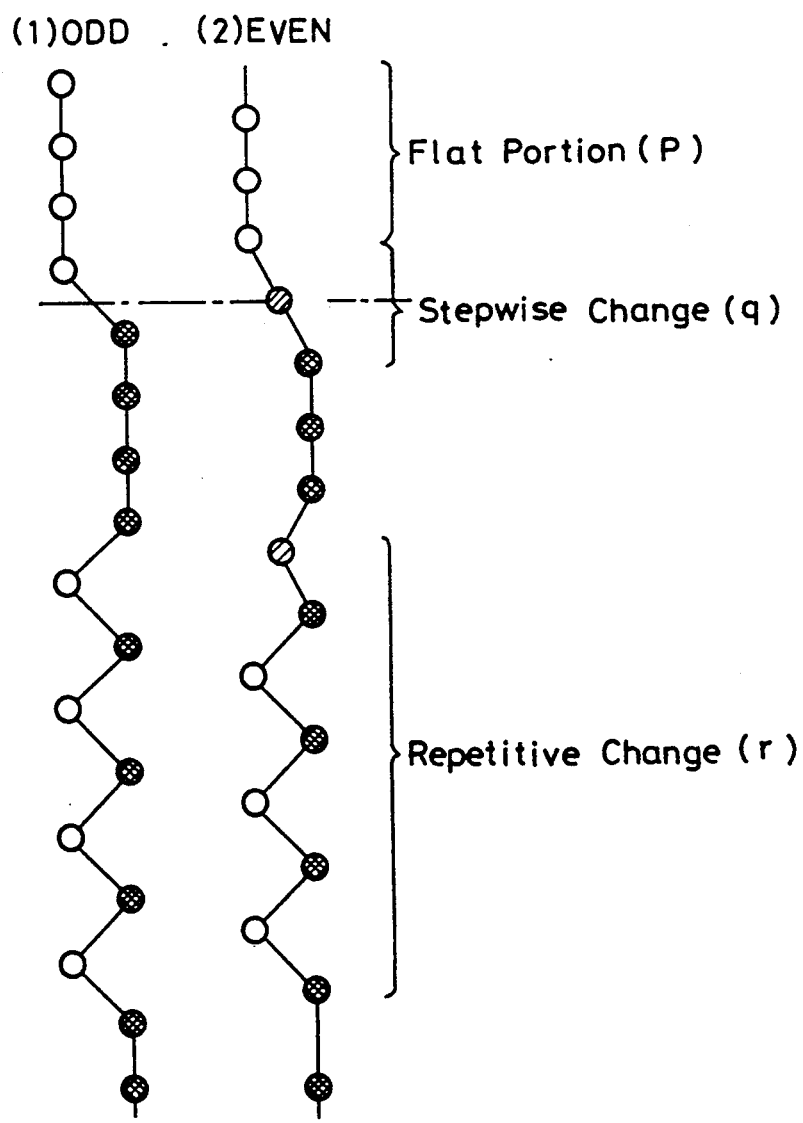
FIG. 10 is a schematic diagram illustrating an odd field and an even field obtained by the interpolation processing of FIG. 9.

FIG. 10 is a diagram illustrating the interpolation processing of FIG. 9, in which an even field (2) is suitably generated from an odd field (1) by the logical filter. Namely, FIG. 10 shows that there are suitably generated a flat portion (p) where the luminance does not change, a portion (q) where the luminance changes stepwise, and a portion (r) where the luminance changes repeatedly.

Figure 11:
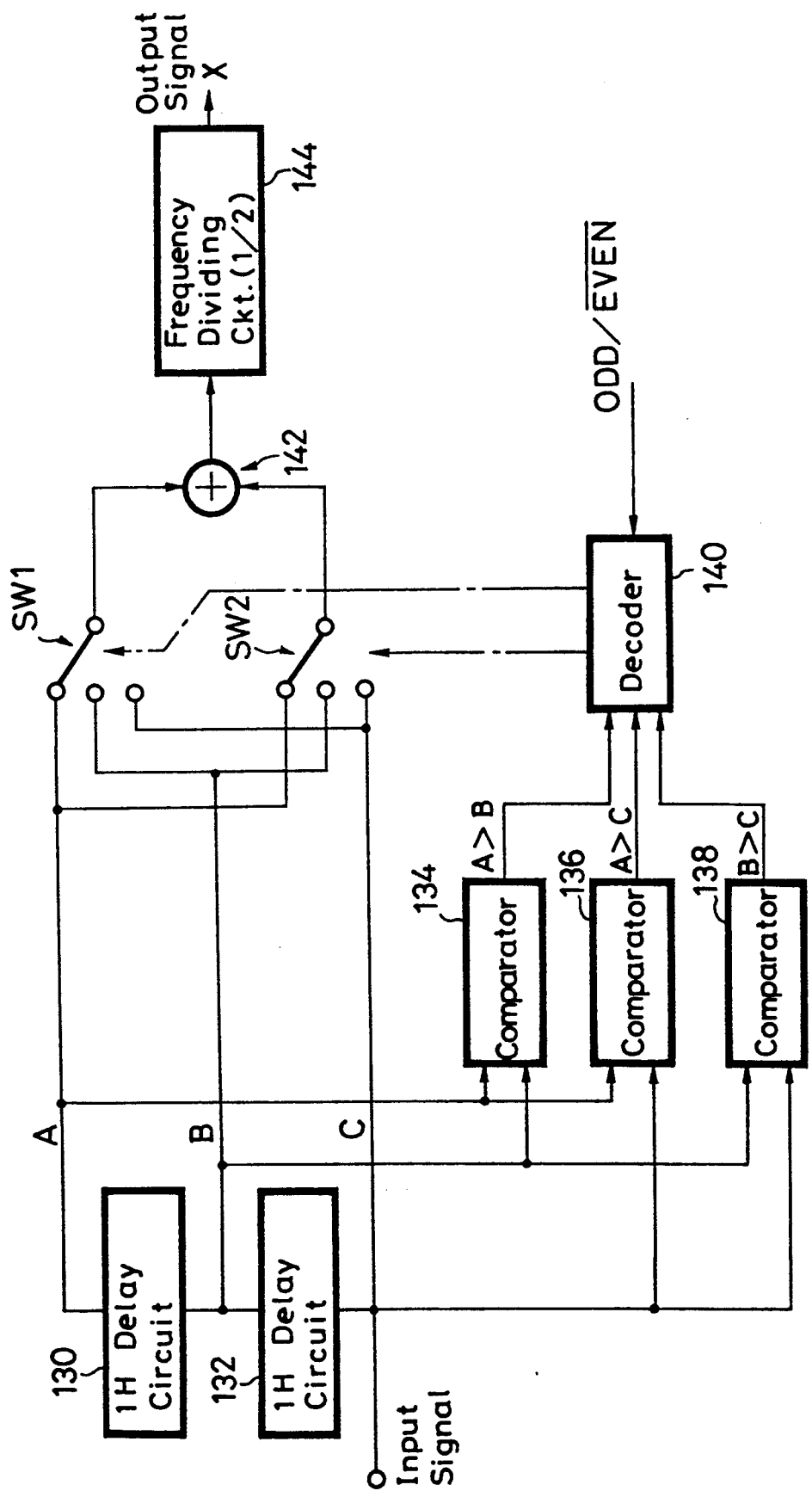
FIG. 11 shows in block form an arrangement of an interpolation circuit for realizing the interpolation method of the present invention by the digital signal processing.
Figure 12A:
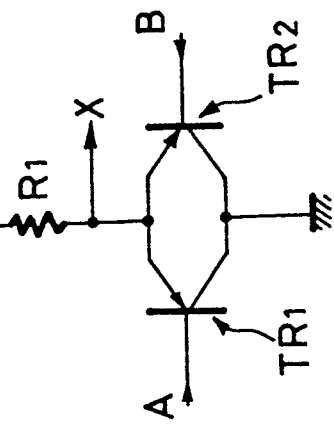
FIGS. 12A to 12D show circuit diagrams for realizing the interpolation method of the present invention by the analog signal processing, respectively.
Figure 12B:
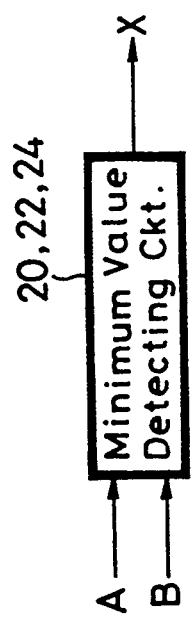
Figure 12C:
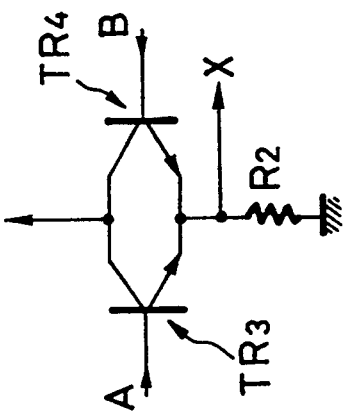
Figure 12D:
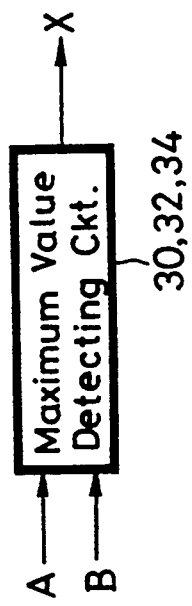

FIG. 11 shows a block diagram of an interpolation circuit which performs the interpolation processing of the interpolation circuit of FIG. 8 by a digital signal processing. In FIG. 11, an input image signal is applied to a one-horizontal line (1H) delay circuit 132 such as a first-in first-out memory (FIFO) and then applied to another 1H delay circuit 130. The input image signal (line C) and outputs (lines A and B) of the 1H delay circuits 130, 132 are applied to comparators 134, 136 and 138 for comparing levels of the lines A, B and C. The comparator 134 compares the levels of the lines A and B to deliver an output signal when the level of the line A is larger than the line B. The comparator 136 compares the lines A and C to deliver an output signal when the line A is larger than line C, and also the comparator 138 compares the lines B and C to deliver an output signal when the line B is larger than the line C. The output signals of the comparators 134 to 138 are applied to a decoder 140, which in turn analyzes the comparison results and delivers a control signal to change-over digital switches SW1, SW2. The switch SW1 outputs a signal representing [MIN {MAX (A,C), MAX (B,C)}] in accordance with the control signal. Further, the switch SW2 outputs a signal representing [MAX {MIN (A,C), MIN (B,C)}] in accordance with the control signal. The output signals of the switches SW1, SW2 are added by an adder 142 and then divided by a factor 2 by a divider 144 so as to match the level of an output signal X. In the case of obtaining data of an even field from data of an odd field by the interpolation processing by applying odd and even field signals to the decoder 140, each of movable contacts of the switches SW1 and SW2 are connected to the output of the 1H delay circuit 132, that is, the line B when the odd field is applied to the decoder 140, and further the movable contacts of the switches SW1, SW2 are controlled to serve as the logical filter when the even field is applied to the decoder. The interpolation circuit of FIG. 8 can also be arranged by analog signal processing circuits.

FIGS. 12A to 12D show circuit configurations of some portions of the interpolation circuit for performing the analog signal processing. That is, each of the comparators 134, 136, 138 corresponding to the MINs 20, 22, 24 of FIG. 8 (FIG. 12A) is replaced with an emitter-coupled logic (ECL) of FIG. 12B serving as a comparator. Each of the comparators 134, 136, 138 corresponding to the MAXs 30, 32, 34 of FIG. 8 (FIG. 12C) is replaced by an ECL of FIG. 12D serving as a comparator. In the ECL comparator of FIG. 12B, two input signals A and B applied to bases of transistors TR1, TR2 are compared and one of the input signals having a smaller level is delivered between the ground and a resistor R1 connected to emitters of the transistors TR1, TR2. Similarly, in the ECL comparator of FIG. 12D, two input signals A and B applied to bases of transistors TR3, TR4 are compared and one of the input signals having a larger level is delivered between emitters thereof and a resistor R2 connected to the ground. The circuit configuration of the interpolation circuit for the analog signal processing other than those of FIGS. 12B and 12D can be arranged by employing the arrangement of FIG. 11.

Thus, according to the interpolation circuit for the digital signal processing of FIG. 11, it is possible to obtain the interpolation circuit with a simple circuit configuration which can decrease the unsmooth changes of a slant line and the line flicker of V-jitter configuration without degrading apparent sharpness and generating flickers at a portion where the luminance of an image changes a number of times in the vertical direction.

As set out above, according to the interpolation method of image datal of the present invention, another field is generated by directly using a given field or performing the mean value interpolation processing at a portion where the luminance of an image does not change in the vertical direction to thereby decrease the unsmooth changes of a slant line, and further the mean value interpolation processing is performed at a portion where the luminance of an image changes singularly in the vertical direction to thereby decrease the line flicker of the V-jitter configuration. Further, since another field signal is generated directly by using a given field at a portion where the luminance of an image changes a number of times in the vertical direction, the degradation of apparent sharpness can be prevented and also the flicker is hardly generated at a portion where the luminance changes finely in the vertical direction.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claim.

What is claimed is:

1. A method of image data interpolation for obtaining an interlaced image signal by utilizing an image signal of only one field, comprising the steps of:
    obtaining a first other field signal by employing a mean value interpolation processing at a portion of an image signal of only one field where a luminance of the image does not change in the vertical direction;
    obtaining a second other field signal by employing the mean value interpolation processing at a portion where a luminance of an image changes singularly in the vertical direction;
    obtaining third other field signal by utilizing a given field signal at some point of a portion where a luminance of an image changes a number of times in the vertical direction; and combining the first, second, and third other field signals to produce an interlaced image.

* * * * *